United States Patent
Shimada

(10) Patent No.: US 9,652,332 B2
(45) Date of Patent: May 16, 2017

(54) INFORMATION PROCESSING APPARATUS AND VIRTUAL MACHINE MIGRATION METHOD

(71) Applicant: FUJITSU LIMITED, Kawasaki-shi, Kanagawa (JP)

(72) Inventor: Naoyuki Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 228 days.

(21) Appl. No.: 14/702,782

(22) Filed: May 4, 2015

(65) Prior Publication Data
US 2015/0234713 A1   Aug. 20, 2015

Related U.S. Application Data

(63) Continuation of application No. PCT/JP2012/078792, filed on Nov. 7, 2012.

(51) Int. Cl.
G06F 11/00 (2006.01)
G06F 11/14 (2006.01)

(52) U.S. Cl.
CPC ...... *G06F 11/1451* (2013.01); *G06F 11/1464* (2013.01); *G06F 11/1469* (2013.01); *G06F 2201/84* (2013.01)

(58) Field of Classification Search
USPC ............................................. 714/4.1, 2, 6.3
See application file for complete search history.

(56) References Cited

U.S. PATENT DOCUMENTS

| | | | |
|---|---|---|---|
| 2003/0018927 A1* | 1/2003 | Gadir | G06F 11/2005 714/4.11 |
| 2010/0058108 A1* | 3/2010 | Nammatsu | G06F 11/0709 714/4.1 |
| 2010/0229180 A1* | 9/2010 | Masuda | G06F 9/45558 718/105 |
| 2010/0325634 A1 | 12/2010 | Ichikawa et al. | |
| 2014/0189441 A1* | 7/2014 | Ishida | G06F 11/3006 714/47.3 |

(Continued)

FOREIGN PATENT DOCUMENTS

| | | |
|---|---|---|
| JP | 2008-243123 | 10/2008 |
| JP | 2009-214994 | 9/2009 |
| JP | 2010-113677 | 5/2010 |

(Continued)

OTHER PUBLICATIONS

Japanese Office Action mailed Feb. 9, 2016 for corresponding Japanese Patent Application No. 2014-545479, with Partial English Translation, 8 pages.

(Continued)

*Primary Examiner* — Sarai Butler
(74) *Attorney, Agent, or Firm* — Fujitsu Patent Center

(57) ABSTRACT

A storage unit stores information indicating a backup history of data associated with each of a plurality of virtual machines operating on one or more information processing apparatuses. An operation unit determines an order of migrating each of the plurality of virtual machines to one or more other information processing apparatuses, based on the information indicating the backup history. The operation unit controls the information processing apparatus so as to migrate each of the virtual machines in the order.

12 Claims, 19 Drawing Sheets

(56) References Cited

U.S. PATENT DOCUMENTS

2014/0359356 A1* 12/2014 Aoki .................. G06F 11/1441
714/24

FOREIGN PATENT DOCUMENTS

| | | |
|---|---|---|
| JP | 2010-117760 | 5/2010 |
| JP | 2010-225021 A | 10/2010 |
| JP | 2010-244524 | 10/2010 |
| JP | 2011-128967 | 6/2011 |
| JP | 2011-192184 | 9/2011 |
| JP | 2011-209811 A | 10/2011 |
| JP | 2012-088943 | 5/2012 |

OTHER PUBLICATIONS

International Search Report, mailed in connection with JP2012/078792 and mailed Dec. 11, 2012.

\* cited by examiner

FIG. 7

| PRIORITY CONDITION TABLE | 112 |
|---|---|
| ELAPSED TIME FROM LATEST BACKUP | BACKUP PRIORITY |
| LESS THAN ONE HOUR | 1 |
| EQUAL TO OR MORE THAN ONE HOUR AND LESS THAN TWO HOURS | 2 |
| EQUAL TO OR MORE THAN TWO HOURS AND LESS THAN THREE HOURS | 3 |
| EQUAL TO OR MORE THAN THREE HOURS AND LESS THAN FOUR HOURS | 4 |
| EQUAL TO OR MORE THAN FOUR HOURS AND LESS THAN FIVE HOURS | 5 |
| EQUAL TO OR MORE THAN FIVE HOURS | 6 |

FIG. 9

| VIRTUAL MACHINE MANAGEMENT TABLE | | | | | |
|---|---|---|---|---|---|
| VIRTUAL MACHINE NAME | BUSINESS AP | BUSINESS GROUP | CONTINU- ATION PRIORITY | INSTALLA- TION SITE | BACKUP SITE |
| VM1 | FS | 1 | 1 | DC1 | DC3 |
| VM2 | FS | 2 | 2 | DC1 | DC3 |
| VM3 | DB | 1 | 2 | DC1 | DC3 |
| VM4 | DB | 2 | 3 | DC1 | DC3 |
| VM5 | Web | 1 | 3 | DC2 | DC3 |
| VM6 | Web | 1 | 4 | DC2 | DC3 |
| VM7 | Web | 2 | 3 | DC2 | DC3 |
| VM8 | Web | 2 | 4 | DC2 | DC3 |

FIG. 10

| | BACKUP HISTORY MANAGEMENT TABLE | | | 115 |
|---|---|---|---|---|
| ITEM No. | VIRTUAL MACHINE NAME | START DATE/TIME | END DATE/TIME | RESULT |
| 1 | VM1 | 10/2 4:00 | 10/2 5:20 | SUCCESS |
| 2 | VM2 | 10/2 0:20 | 10/2 1:30 | SUCCESS |
| 3 | VM3 | 10/2 4:10 | 10/2 5:30 | SUCCESS |
| 4 | VM4 | 10/2 0:20 | 10/2 2:30 | SUCCESS |
| 5 | VM5 | 10/2 4:00 | 10/2 4:50 | SUCCESS |
| 6 | VM6 | 10/2 0:20 | 10/2 3:50 | SUCCESS |
| 7 | VM7 | 10/2 4:00 | 10/2 5:40 | FAILURE |
| 8 | VM8 | 10/2 0:00 | 10/2 1:00 | SUCCESS |

FIG. 11

| BACKUP PRIORITY TABLE | 116 |
|---|---|
| VIRTUAL MACHINE NAME | BACKUP PRIORITY |
| VM1 | 1 |
| VM2 | 5 |
| VM3 | 1 |
| VM4 | 4 |
| VM5 | 2 |
| VM6 | 3 |
| VM7 | 6 |
| VM8 | 6 |

FIG. 12

| MIGRATION ORDER TABLE | | |
|---|---|---|
| VIRTUAL MACHINE NAME | OVERALL PRIORITY EVALUATION VALUE | MIGRATION ORDER |
| VM1 | 3 | 8 |
| VM2 | 8 | 5 |
| VM3 | 5 | 7 |
| VM4 | 9 | 4 |
| VM5 | 8 | 6 |
| VM6 | 10 | 3 |
| VM7 | 12 | 2 |
| VM8 | 13 | 1 |

FIG. 18

| MIGRATION ORDER TABLE | | |
|---|---|---|
| VIRTUAL MACHINE NAME | OVERALL PRIORITY EVALUATION VALUE | MIGRATION ORDER |
| VM1 | 10 | 8 |
| VM2 | 13 | 4 |
| VM3 | 10 | 7 |
| VM4 | 13 | 3 |
| VM5 | 10 | 6 |
| VM6 | 10 | 5 |
| VM7 | 13 | 2 |
| VM8 | 13 | 1 |

| MIGRATION ORDER TABLE | | 117b |
|---|---|---|
| VIRTUAL MACHINE NAME | OVERALL PRIORITY EVALUATION VALUE | MIGRATION ORDER |
| VM1 | 9 | 8 |
| VM2 | 32 | 3 |
| VM3 | 13 | 7 |
| VM4 | 31 | 4 |
| VM5 | 22 | 6 |
| VM6 | 30 | 5 |
| VM7 | 42 | 2 |
| VM8 | 45 | 1 |

INFORMATION PROCESSING APPARATUS AND VIRTUAL MACHINE MIGRATION METHOD

CROSS-REFERENCE TO RELATED APPLICATION

This application is a continuation application of International Application PCT/JP2012/078792 filed on Nov. 7, 2012 which designated the U.S., the entire contents of which are incorporated herein by reference.

FIELD

The embodiments discussed herein relate to an information processing apparatus and a virtual machine migration method.

BACKGROUND

In the field of information processing, virtualization technology is used which allows a plurality of virtual computers (which may also be referred to as virtual machines or logic hosts) to operate on a physical computer (which may also be referred to as a physical machine or a physical host). Software such as an OS (Operating System) may be executed on each virtual machine. A physical machine which uses virtualization technology executes software for managing a plurality of virtual machines. For example, software referred to as a hypervisor may assign processing ability of a CPU (Central Processing Unit) or memory area of a RAM (Random Access Memory) to a plurality of virtual machines as resources for operation.

In addition, systems including a plurality of physical machines include one capable of switching a physical machine which executes virtual machines thereon. For example, a technique is used which allows migration of data associated with a virtual machine between hypervisors after terminating or without terminating the virtual machine.

For example, when a plurality of virtual machines is to be migrated, there is a proposal to select a set of a virtual machine and a migration method that minimizes the time needed for migration, and create a migration schedule so that the virtual machine selected according to the selected migration method is migrated earlier.

In addition, there is also a proposal to schedule migration of a virtual machine so as to reduce the load on the virtual machine, the physical machine, and the network by grasping or analyzing the variation of the load on the virtual machine, the physical machine, and the network using an approximation formula such as a high-degree equation.

There is also a proposal to restore, when a failure occurs in a backup source system, the backup source system in a restore destination system based on the data preliminarily backed up by the backup apparatus.

Japanese Laid-Open Patent Publication No. 2010-244524
Japanese Laid-Open Patent Publication No. 2010-117760
Japanese Laid-Open Patent Publication No. 2008-243123

It may be desired to migrate a plurality of virtual machines to another physical machine which is different from the current one. That is, for example, when the installation site of the physical machine is affected by a disaster. Migrating virtual machines to a physical machine at another site allows continuation of the processing. However, the time needed to migrate the virtual machines may be limited in the event of an emergency. For example, the building at the site may be about to collapse at the time of a disaster such as an earthquake or a fire. In such a case, it is not always possible for all the virtual machines to migrate to another site within the time limit. Accordingly, there arises a problem of how to efficiently migrate virtual machines.

For example, when any of the virtual machines have failed to be migrated in time, the virtual machines may be restored on a physical machine at another site using preliminarily taken backup data. However, depending on the backup status, sometimes, it is not easy to restore a virtual machine to the state as close as it used to be. For example, the older the backup data is, the more difficult it is to restore to the latest state.

SUMMARY

According to an aspect, there is provided an information processing apparatus including a memory configured to store information indicating a backup history of data associated with each of a plurality of virtual machines operating on one or more apparatuses, and a processor configured to perform a procedure including determining an order of migrating each of the plurality of virtual machines to one or more other apparatuses, based on the information indicating the backup history, and controlling the one or more apparatuses so as to migrate each of the plurality of virtual machines in the order.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an exemplary priority condition table of the second embodiment;

FIG. 9 illustrates an exemplary virtual machine management table of the second embodiment;

FIG. 10 illustrates an exemplary backup history management table of the second embodiment;

FIG. 11 illustrates an exemplary backup priority table of the second embodiment;

FIG. 12 illustrates a migration order table of the second embodiment;

FIG. 18 illustrates another exemplary evaluation (part 1) of the migration order of the second embodiment; and FIG. 19 illustrates another exemplary evaluation (part 2) of the migration order of the second embodiment.

DESCRIPTION OF EMBODIMENTS

Figure 1:
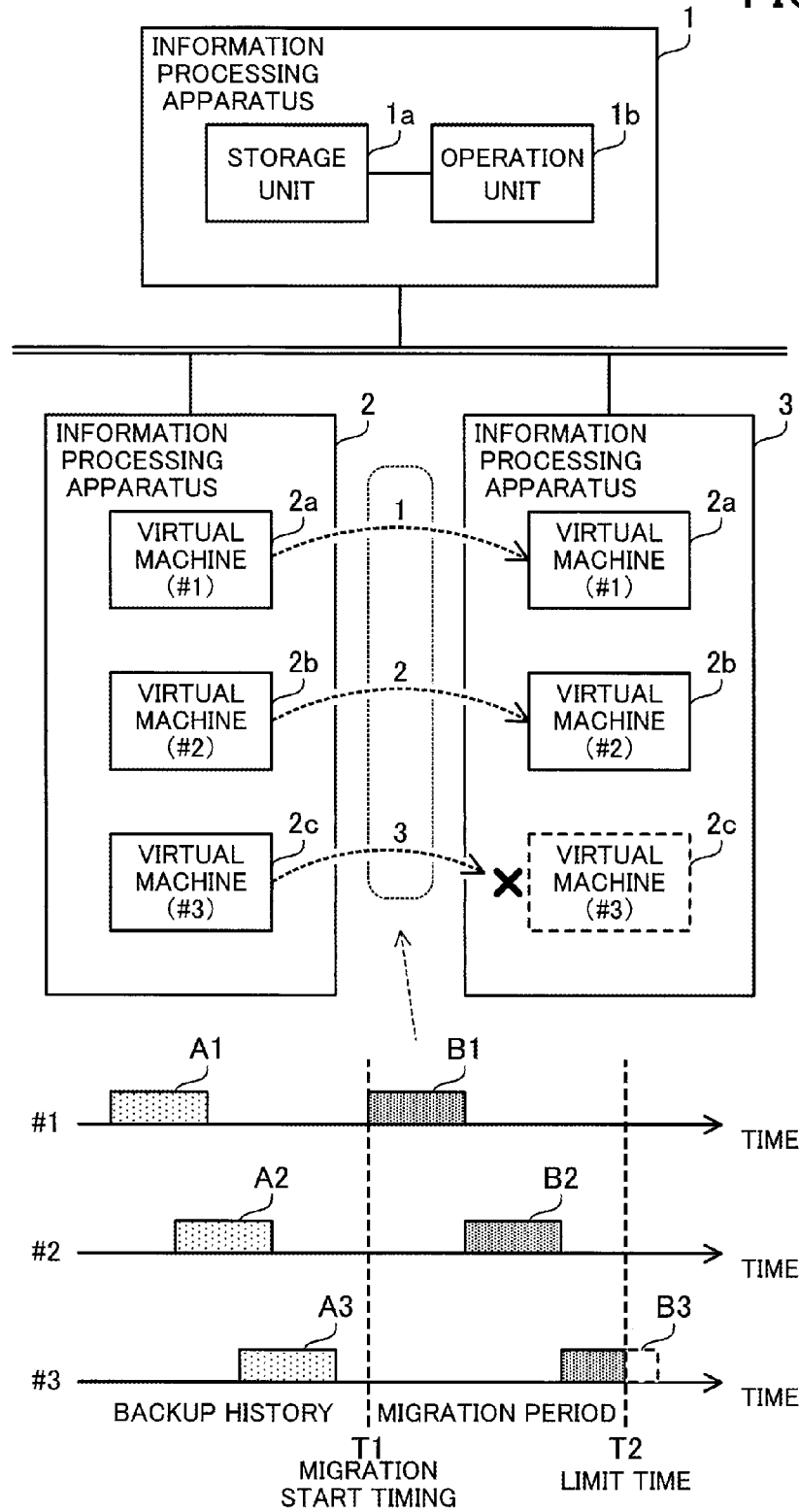
FIG. 1 illustrates an information processing system of a first embodiment.

Several embodiments will be described below with reference to the accompanying drawings, wherein like reference numerals refer to like elements throughout.

First Embodiment

FIG. 1 illustrates an information processing system of a first embodiment. The information processing system of the first embodiment has information processing apparatuses 1, 2 and 3. The information processing apparatuses 1, 2 and 3 are connected via a network. The information processing apparatus 1 is a computer configured to manage virtual machines operating on the information processing apparatuses 2 and 3. The information processing apparatus 2 is able to execute a plurality of virtual machines thereon. For example, virtual machines 2a, 2b and 2c are executed on the information processing apparatus 2. The information processing apparatus 3 is also able to execute a plurality of virtual machines. For example, each of the information processing apparatuses 2 and 3 may execute a hypervisor thereon. The hypervisor may allocate resources of the information processing apparatuses 2 and 3 to virtual machines.

The information processing apparatus 1 has a storage unit 1a and an operation unit 1b. The storage unit 1a is a memory such as a RAM. The operation unit 1b is a processor such as a CPU. Information processing of the first embodiment may be realized by the operation unit 1b executing a program stored in the storage unit 1a.

The storage unit 1a stores information indicating a backup history of data associated with each of a plurality of virtual machines. The data associated with a virtual machine may include data used for processing by software such as the OS or applications executed on the virtual machine. The backed up data of the virtual machines 2a, 2b and 2c may be stored in a storage device (illustration omitted in FIG. 1) connected to a network, in association with the virtual machines 2a, 2b and 2c.

For example, the storage unit 1a stores information indicating a backup history A1 for the virtual machine 2a. The storage unit 1a stores information indicating a backup history A2 for the virtual machine 2b. The storage unit 1a stores information indicating a backup history A3 for the virtual machine 2c. Here, identification information of the virtual machine 2a is denoted by "#1". Identification information of the virtual machine 2b is denoted by "#2". Identification information of the virtual machine 2c is denoted by "#3".

The operation unit 1b determines the order of migrating each of a plurality of virtual machines to the information processing apparatus 3, based on the backup history. For example, the operation unit 1b determines the migration order so that virtual machines are migrated in the chronological order of acquisition of the latest backup. The operation unit 1b controls the information processing apparatus 2 so as to migrate each of the plurality of virtual machines in the aforementioned order. The operation unit 1b may sequentially migrate virtual machines one by one, or may sequentially migrate them in units of plural virtual machines.

Upon detection of an occurrence of a disaster such as an earthquake or a fire, the operation unit 1b may determine the migration order as described above, and migrate a plurality of virtual machines operating on the information processing apparatus 2 to the information processing apparatus 3. Alternatively, upon reception of an input by a user instructing to start migration, the operation unit 1b may determine the migration order as described above, and migrate a plurality of virtual machines operating on the information processing apparatus 2 to the information processing apparatus 3. The operation unit 1b may determine the migration order preliminarily (before detecting an occurrence of a disaster or the like) each time a backup history of each virtual machine is acquired.

For example, the operation unit 1b starts migrating the virtual machines 2a, 2b and 2c to the information processing apparatus 3 at a migration start timing T1. Backup histories A1, A2 and A3 include information indicating the latest periods during which backups have been performed for the virtual machines 2a, 2b and 2c, with regard to the migration start timing T1. Here, a period during which a backup has been performed represents a time length from the start time point to the end time point. When the periods during which backups have been performed are compared to determine which one is newer, the end time points of respective periods may be compared. Alternatively, the start time points of respective periods may be compared. When the end time points are compared, for example, chronologically sorting the end time points provides the backup histories A1, A2 and A3 (the history A1 being the oldest and the history A3 being the newest). In such a case, the operation unit 1b determines to perform a migration to the information processing apparatus 3 in the order of the virtual machines 2a, 2b and 2c.

Migration periods B1, B2 and B3 indicate periods needed to migrate each of the virtual machines 2a, 2b and 2c after the migration start timing T1. The migration period B1 corresponds to the period needed to migrate the virtual machine 2a. The migration period B2 corresponds to the period needed to migrate the virtual machine 2b. The migration period B3 corresponds to the period needed to migrate the virtual machine 2c. For example, when the operation unit 1b determines to perform a migration in the order of the virtual machines 2a, 2b and 2c, the operation unit 1b controls the information processing apparatus 2 to perform the migration in the order of the virtual machines 2a, 2b and 2c. Accordingly, the time series of the start time points of the migration periods B1, B2 and B3 also conform to this order.

According to the information processing apparatus 1, the order of migrating the virtual machines 2a, 2b and 2c is determined by the operation unit 1b, based on the backup history of the data associated with each of the virtual machines 2a, 2b and 2c operating on the information processing apparatus 2. The information processing apparatus 2 is controlled by the operation unit 1b so as to migrate the virtual machines 2a, 2b and 2c to the information processing apparatus 3 in the aforementioned order.

Accordingly, the information processing apparatus 1 is able to migrate the virtual machines 2a, 2b and 2c in the order considering the restorable state. For example, in an emergency such as when the installation site of the information processing apparatus 2 has been affected by a disaster, it may be desirable to migrate the virtual machines 2a, 2b and 2c to the information processing apparatus 3 installed in another site. However, the time available for migration may be limited in an emergency. This is because the installation site of the information processing apparatus 2 may be about to collapse, or the time available for supplying electric power may be limited. Accordingly, it is not always possible for all the virtual machines to migrate to the information processing apparatus 3 located at another site within the time limit.

Therefore, the information processing apparatus 1 determines the migration order, based on the backup histories A1, A2 and A3 associated with the virtual machines 2a, 2b and 2c. For example, migration of the virtual machine 2a whose backup has been taken earlier is given a higher priority. This is because the older the backup data is, the more difficult it is to restore to the latest state. For example, when a migration failed to be completed in time and restoring is attempted from a backup, it is very likely that the restoring work takes time, resulting in a prolonged interruption of business. On the other hand, migration of the virtual machine 2c whose backup has been taken recently is given a lower priority. This is because the newer the backup data is, the easier it is to restore to the latest state.

It is assumed that migration of the virtual machine 2c with a lower priority failed to be completed before a limit time T2. In such a case, the virtual machine 2c may be restored on the information processing apparatus 3, using backup data stored in the storage device. According to the backup history A3, the backup data of the virtual machine 2c has been acquired at a later time point than the time point when backups of the virtual machines 2a and 2b have been performed. In other words, the virtual machine 2c is restorable to a state closer to the state at the migration start timing T1 (original state) than the virtual machines 2a and 2b. Accordingly, it is relatively easier to restore the virtual machine 2c to the original state than the virtual machines 2a and 2b. Even when a complete restoration to the original state is impossible, adverse effect on the system is relatively small.

As described above, determining the migration order based on the backup history allows migration of the virtual machines 2a, 2b and 2c in the order considering the restorable state. As a result, even when some of the virtual machines have failed to be migrated within the time limit, there is a higher possibility that the system is restored to a later state. The possibility of continuing the business without interruption also increases.

Although it is assumed in the above description that the virtual machines 2a, 2b and 2c are executed on the information processing apparatus 2, they may be executed on a plurality of information processing apparatuses. For example, similar control may be performed even when the virtual machine 2a is executed on a first information processing apparatus, and the virtual machines 2b and 2c are executed on a second information processing apparatus. In addition, there may be a plurality of information processing apparatuses to be the migration destination of the virtual machines 2a, 2b and 2c. For example, similar control may be performed also when the virtual machines 2a and 2b are migrated to a third information processing apparatus, and the virtual machine 2c is migrated to a fourth information processing apparatus.

Second Embodiment

Figure 2:
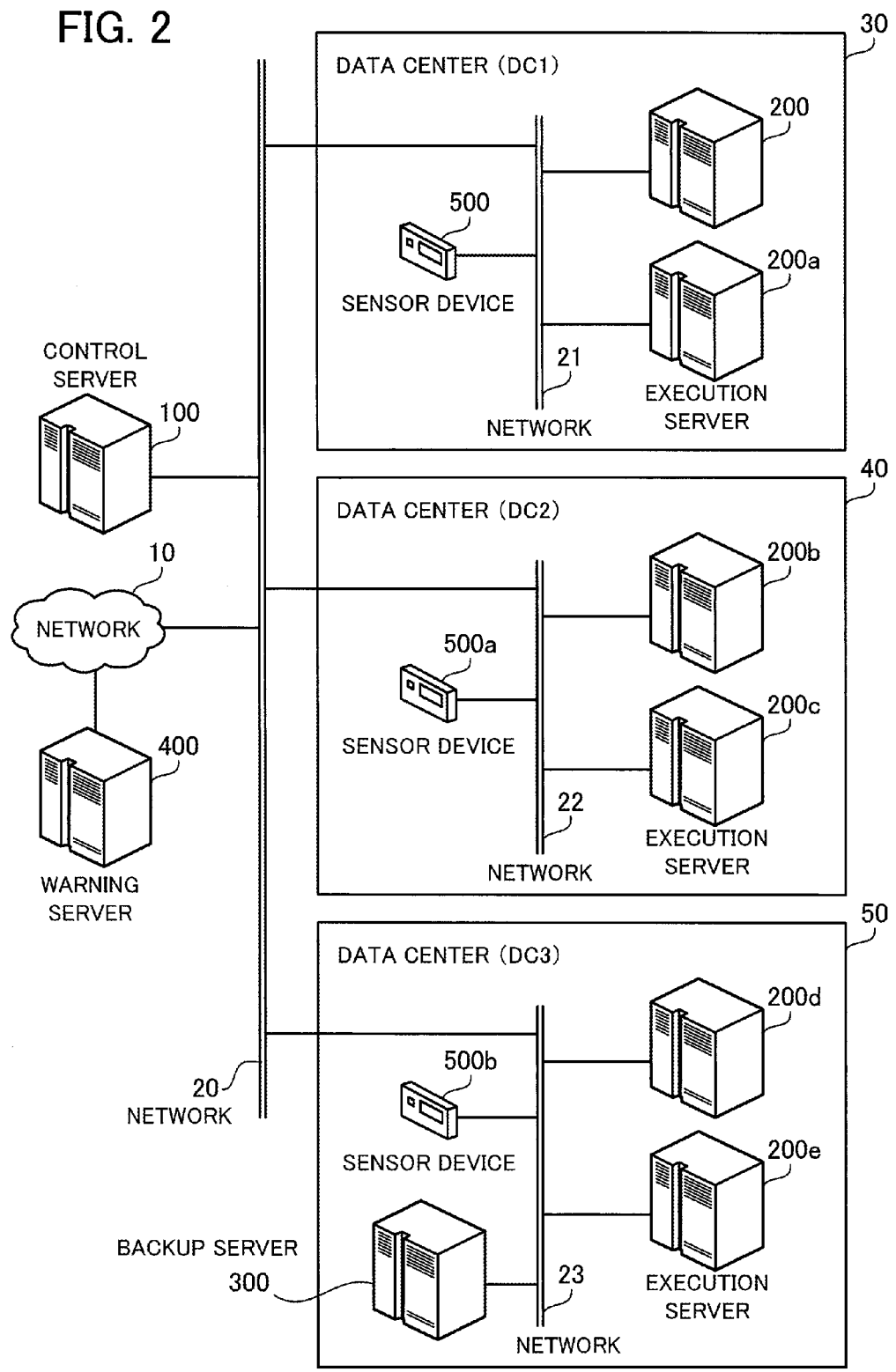
FIG. 2 illustrates an information processing system of a second embodiment.

FIG. 2 illustrates an information processing system of a second embodiment. The information processing system of the second embodiment manages a plurality of virtual machines operating on server computers installed in Data Centers (DC) 30, 40 and 50. The data centers 30, 40 and 50 are installed in a plurality of geographically separated sites.

The information processing system of the second embodiment has a control server 100, execution servers 200, 200a, 200b, 200c, 200d and 200e, a backup server 300, a warning server 400, and sensor devices 500, 500a and 500b. The execution servers 200 and 200a, and the sensor device 500 are installed in the data center 30. The execution servers 200b and 200c, and the sensor device 500a are installed in the data center 40. The execution servers 200d and 200e, the backup server 300, and the sensor device 500b are installed in the data center 50.

The warning server 400 is connected to a network 10. The network 10 is a wide area network such as the Internet or a WAN (Wide Area Network), for example. The control server 100 is connected to a network 20. The network 20 is a wide area network connecting the data centers 30, 40 and 50. The network 20 is connected to the network 10.

The execution servers 200 and 200a, and the sensor device 500 are connected to a network 21. The network 21 is an intra-base network of the data center 30. The execution servers 200b and 200c, and the sensor device 500a are connected to a network 22. The network 22 is an intra-base network of the data center 40. The execution servers 200d and 200e, the backup server 300, and the sensor device 500b are connected to a network 23. The network 23 is an intra-base network of the data center 50. The networks 21, 22 and 23 are connected to the network 20.

The control server 100 is a server computer configured to manage or control virtual machines operating on an execution server (e.g., the execution server 200) installed in each data center. The control server 100 receives a notification or warning of occurrence of a disaster from the warning server 400, or the sensor devices 500, 500a and 500b. The control server 100 controls migration of virtual machines between execution servers, based on information included in the warning.

The execution servers 200, 200a, 200b, 200c, 200d and 200e are server computers capable of executing virtual machines. For example, a virtual machine executes a business application. For example, a user may use a function of the application from a client computer (illustration omitted in FIG. 2) connected to the networks 10 and 20. Each execution server transmits (backs up), regularly to the backup server 300, data to be used for processing performed by virtual machines. Each execution server is also capable of restoring virtual machines, using backup data stored in the backup server 300.

The backup server 300 is a server computer configured to store backup data for each virtual machine. The backup server 300 stores, for each virtual machine, backup data transmitted regularly from each execution server. In addition, the backup server 300, upon receiving a restore request from any of the execution servers, provides the requested backup data of the virtual machine to the corresponding execution server.

Note that, the backup server may be installed in each data center such as the data centers 30 and 40. In such a case, for example, each execution server may store its own backup data in a distributed manner in respective backup servers installed in a plurality of data centers other than the data center in which the execution server itself is installed.

The warning server 400 is a server computer configured to give a notification or warning of occurrence of a disaster. For example, upon occurrence of a disaster such as an earthquake, a tsunami, or a fire, the warning server 400 issues and transmits to the control server 100, a notification of the occurrence of the disaster or a warning about areas which may be affected by the disaster.

The sensor devices 500, 500a and 500b are sensor devices configured to measure disaster-related sensor data such as seismic intensity or water level. The sensor devices 500, 500a and 500b are provided with a communication function via a network. For example, the sensor device 500 alerts that a disaster has occurred in the data center 30 in which the sensor device 500 is installed, when the measured sensor data (e.g., seismic intensity) has exceeded a threshold value. The notification of the occurrence of the disaster is transmitted also to the control server 100.

Figure 3:
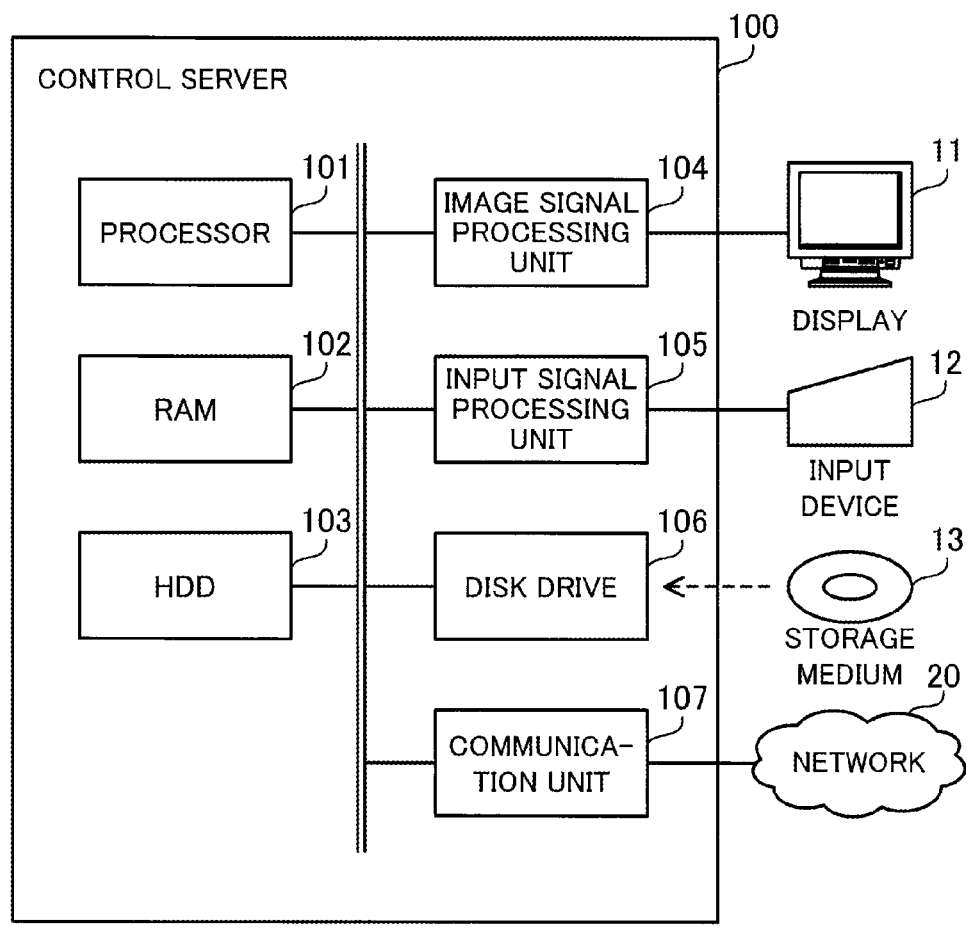
FIG. 3 illustrates an exemplary hardware configuration of a control server of the second embodiment.

FIG. 3 illustrates an exemplary hardware configuration of the control server of the second embodiment. The control server 100 has a processor 101, a RAM 102, an HDD (Hard Disk Drive) 103, an image signal processing unit 104, an input signal processing unit 105, a disk drive 106, and a communication unit 107. Each unit is connected to a bus in the control server 100. The execution servers 200, 200a, 200b, 200c, 200d and 200e, the backup server 300, and the warning server 400 may also be realised by using a hardware configuration similar to the control server 100.

The processor 101 controls information processing of the control server 100. The processor 101 may be a multiprocessor. The processor 101 is, for example, a CPU, an MPU (Micro Processing Unit), a DSP (Digital Signal processor), an ASIC (Application Specific Integrated Circuit), an FPGA (Field Programmable Gate Array), a PLD (Programmable Logic Device), or the like. The processor 101 may be a combination of two or more elements of a CPU, an MPU, a DSP, an ASIC, an FPGA, and a PLD.

The RAM 102 is a main storage device of the control server 100. The RAM 102 temporarily stores at least a part of the OS program or application programs to be executed by the processor 101. In addition, the RAM 102 stores various data to be used in the processing by the processor 101.

The HDD 103 is an auxiliary storage device of the control server 100. The HDD 103 magnetically writes or reads data to and from a built-in magnetic disk. The HDD 103 stores the OS program, application programs, and various data. The control server 100 may include another type of auxiliary storage device such as a flash memory or an SSD (Solid State Drive), or may include a plurality of auxiliary storage devices.

The image signal processing unit 104 outputs an image to a display 11 connected to the control server 100, according to an instruction from the processor 101. A CRT (Cathode Ray Tube) display or a liquid crystal display may be used as the display 11.

The input signal processing unit 105 acquires, and notifies to the processor 101, input signals from an input device 12 connected to the control server 100. A pointing device such as a mouse, a touch panel, or a keyboard may be used as the input device 12.

The disk drive 106 is a drive configured to read programs or data stored in a storage medium 13. A magnetic disk such as a Flexible Disk (FD) or an HDD, an optical disk such as a CD (Compact Disc) or a DVD (Digital Versatile Disc), and a Magneto-Optical disk (MO), for example, may be used as the storage medium 13. According to an instruction from the processor 101, the disk drive 106 stores, in the RAM 102 or the HDD 103, programs or data which have been read from the storage medium 13.

The communication unit 107 communicates with other information processing apparatuses (e.g., the execution server 200) via the network 20.

However, the control server 100 need not include the disk drive 106 and, when solely accessed from other information processing apparatuses, need not include the image signal processing unit 104 and the input signal processing unit 105. In addition, the display 11 and the input device 12 may be formed integrally with the housing of the control server 100.

Figure 4:
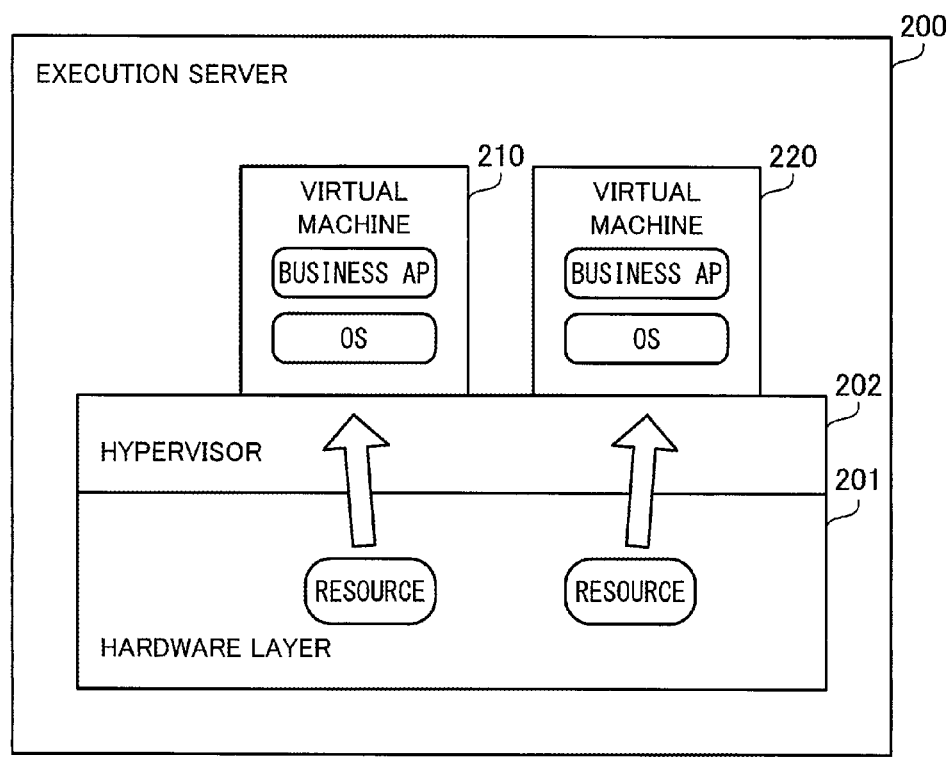
FIG. 4 illustrates an exemplary virtual machine of the second embodiment.

FIG. 4 illustrates an exemplary virtual machine of the second embodiment. The execution server 200 has a hardware layer 201, a hypervisor 202, and virtual machines 210 and 220.

The hardware layer 201 is a layer corresponding to resources to be provided to the virtual machines 210 and 220 such as an operation resource of the CPU included in the execution server 200 or a storage resource of the RAM included in the execution servers 200.

The hypervisor 202 controls a plurality of virtual machines 210 and 220 operating on the execution server 200. The hypervisor 202 allocates resources of the hardware layer 201 to the virtual machines 210 and 220.

The virtual machines 210 and 220 are virtual computers operating on the execution server 200. The virtual machines 210 and 220 operate in parallel by control of the hypervisor 202. The virtual machines 210 and 220 execute the OS or business AP (APplication) using the allocated resources.

The execution servers 200a, 200b, 200c, 200d and 200e are also able to execute a plurality of virtual machines, similarly to the execution server 200.

Figure 5:
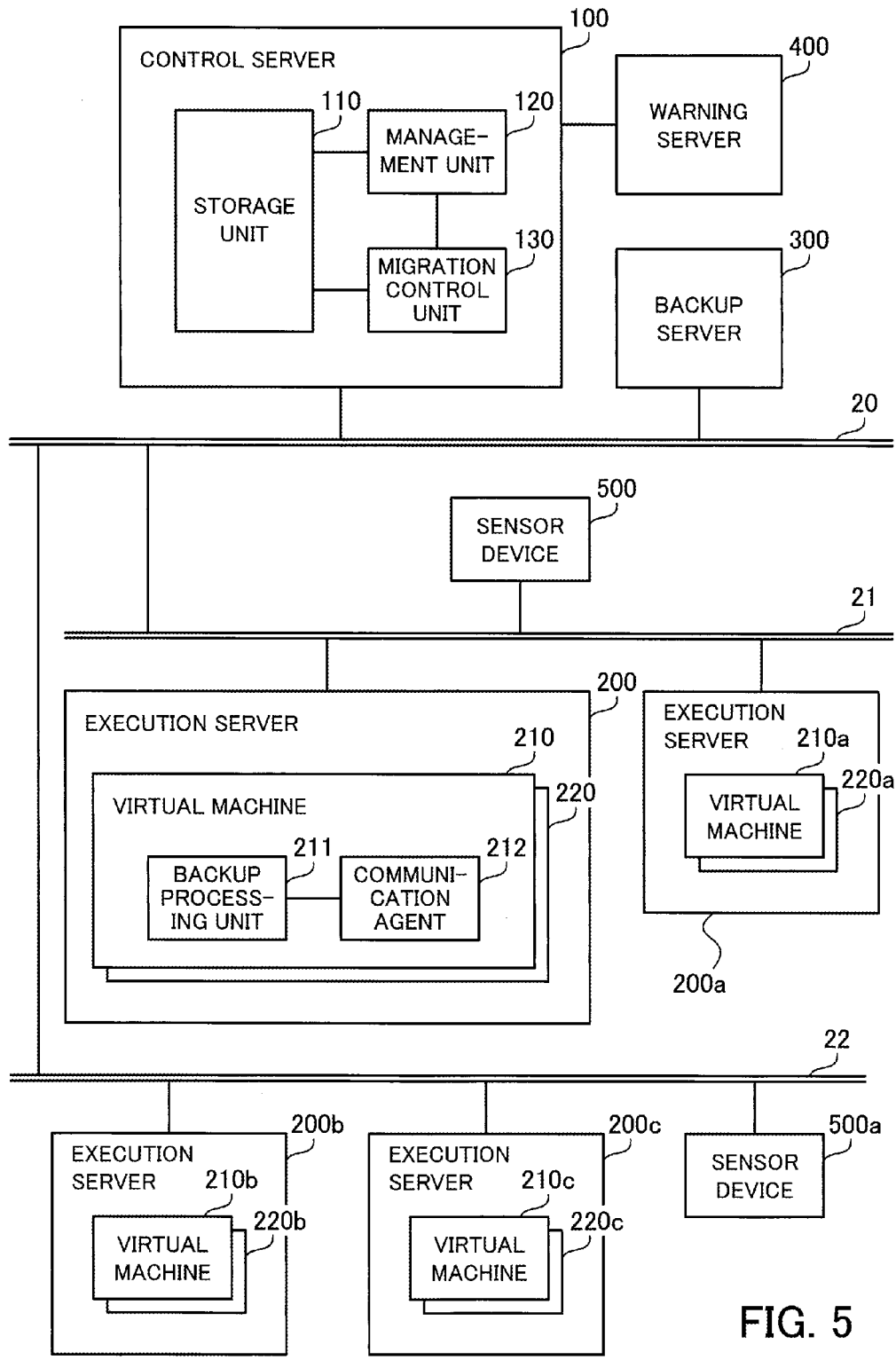
FIG. 5 illustrates an exemplary software configuration of the second embodiment.

FIG. 5 illustrates an exemplary software configuration of the second embodiment. Here, illustration of the data center 50 and the networks 10 and 23 is omitted in FIG. 5. The units illustrated in FIG. 5 may be realized by a processor executing programs stored in the RAM provided in each server computer. The control server 100 has a storage unit 110, a management unit 120, and a migration control unit 130.

The storage unit 110 stores information for controlling migration of each virtual machine. For example, the storage unit 110 stores information indicating the area in which the data centers 30, 40 and 50 exist, and information for determining the migration order of virtual machines.

The management unit 120 acquires, regularly from each execution server, information indicating the backup history (also simply referred to as backup history, in the following) associated with a virtual machine (e.g., virtual machine 210) operating on each execution server. The management unit 120 stores the acquired backup history in the storage unit 110.

In addition, upon receiving warning data from the warning server 400, the sensor devices 500 and 500a, or the like, the management unit 120 determines the virtual machine to be migrated to another site, based on the warning data. The management unit 120 determines the migration order of the virtual machines, based on the information stored in the storage unit 110. The management unit 120 selects a migration destination execution server. For example, a plurality of execution servers being candidates of the migration destination is selected from execution servers installed in a data center outside the warning area specified in the warning data. Furthermore, the candidates are narrowed down considering available resources or load status of the candidate execution servers.

The migration control unit 130 controls respective execution servers so as to migrate the virtual machines in the migration order determined by the management unit 120.

The execution server 200 has the virtual machines 210 and 220 as described above. The virtual machine 210 has a backup processing unit 211 and a communication agent 212.

The backup processing unit 211 transmits backup data regularly to the backup server 300. The backup processing unit 211 stores a backup history in a storage area on the execution server 200 allocated to the virtual machine 210. A backup history includes the start time and the end time of backup, and the result of success or failure. The backup history may include information indicating a storage destination storage device (e.g., the backup server 300) of the backup data. The backup processing unit 211 is also able to restore data of the OS or business APs of the virtual machine 210, using the backup data stored in the backup server 300.

Here, the backup processing unit 211 takes a backup for each virtual machine regularly (e.g., once a day, or once a week). Full backup, incremental backup, or differential backup are conceivable as backup methods. The backup processing unit 211 may use any of the methods. In the case of incremental or differential backup, data of the OS or business APs of the virtual machine 210 may be restored, using the backup data acquired in the previous full backup, together with the backup data acquired in the incremental or differential backup.

According to a request from the control server 100, the communication agent 212 transmits a backup history acquired by the backup processing unit 211 to the control server 100.

The execution server 200a has the virtual machines 210a and 220a. The execution server 200b has the virtual machines 210b and 220b. The execution server 200c has the virtual machines 210c and 220c. The virtual machines 220, 210a, 220a, 210b, 220b, 210c and 220c also have a function similar to that of the virtual machine 210.

Figure 6:
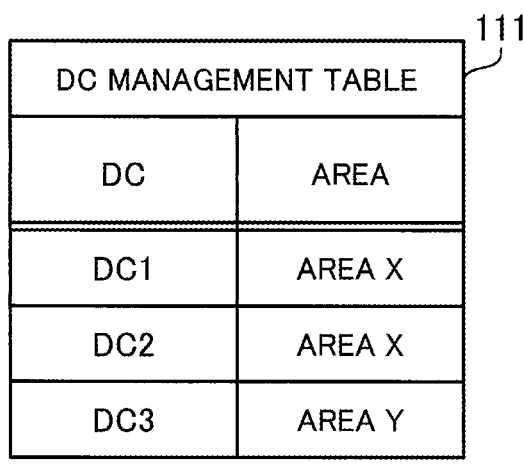
FIG. 6 illustrates an exemplary DC management table of the second embodiment.

FIG. 6 illustrates an exemplary DC management table of the second embodiment. The DC management table 111 is a table used for managing the area in which the data centers 30, 40 and 50 are installed. The DC management table 111 is stored in the storage unit 110. The DC management table 111 includes columns for DC and area.

The DC column has registered therein data center names for identifying data centers. Here, the data center name of the data center 30 is "DC1". The data center name of the data center 40 is "DC2". The data center name of the data center 50 is "DC3". The area column has registered therein areas in which data centers exist.

For example, the DC management table 111 has registered therein information indicating a data center name "DC1" and an "area X". The information indicates that the data center 30 exists in an area denoted by area X. In addition, the DC management table 111 has registered therein information indicating a data center name "DC2" and an "area Y". The information indicates that the data center 50 exists in an area denoted by area Y. The area Y is an area geographically separated from the area X.

FIG. 7 illustrates an exemplary priority condition table of the second embodiment. The priority condition table 112 is a table having defined therein priorities (also referred to as backup priority, in the following) of virtual machines according to the backup history. The priority condition table 112 is stored in the storage unit 110. The priority condition table 112 includes columns for elapsed time from latest backup and backup priority.

The elapsed-time-from-latest-backup column has registered therein ranges of elapsed times in the latest backups. The backup priority column has registered therein numerical values indicating backup priorities. The larger the numerical value of a backup priority is, the higher (more preferential) the priority is.

For example, the priority condition table 112 has registered therein information indicating that the backup priority is "1" when the elapsed time from the latest backup history to the current time point of the virtual machine is "less than one hour". Similarly, the backup priority is "2" when the elapsed time is "equal to or more than one hour and less than two hours". The backup priority is "3" when the elapsed time is "equal to or more than two hours and less than three hours". The backup priority is "4" when the elapsed time is "equal to or more than three hours and less than four hours". The backup priority is "5" when the elapsed time is "equal to or more than four hours and less than five hours". The backup priority is "6" when the elapsed time is "equal to or more than five hours". The larger the numerical value is, the higher the priority is, and therefore the backup priority "6" is the highest priority and the backup priority "1" is the lowest priority in the priority condition table 112.

Note that, the management unit 120 may generate the priority condition table 112 based on predetermined definition information. For example, definition information including an effective time range of backup and a number of backup priority levels may be allowed to be input to the management unit 120. In such a case, the management unit 120 may generate the priority condition table 112 based on the effective time range of backup and the number of backup priority levels. For example, it is assumed that there are specified an effective time range of backup "five hours" and a number of backup priority levels "6". Accordingly, the management unit 120 uniformly divides the range of five hours into five priority levels, setting the range "equal to or more than five hours" as the highest priority level (six levels in all). In the above manner, the management unit 120 may generate the priority condition table 112.

Although a case has been illustrated where the range of elapsed time is uniformly one hour, the range need not be uniform. For example, the priority condition table 112 may be generated so that the range of elapsed time with the first backup priority is different from the range of elapsed time with the second backup priority.

Figure 8:
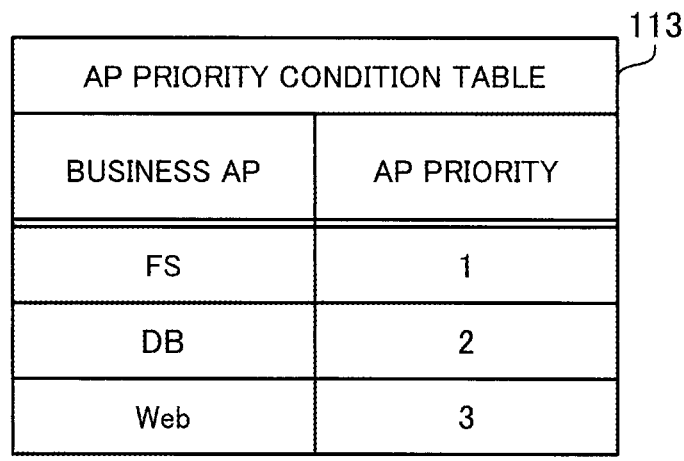
FIG. 8 illustrates an exemplary AP priority condition table of the second embodiment.

FIG. 8 illustrates an exemplary AP priority condition table of the second embodiment. The AP priority condition table 113 is a table having defined therein priorities (which may also be referred to as AP priority, in the following) of virtual machines depending on the importance of business APs. The AP priority condition table 113 is stored in the storage unit 110. The AP priority condition table 113 includes columns for business AP and AP priority.

The business AP column has registered therein information indicating types of business APs executed by virtual machines. For example, "FS" (File Server) is set to the business AP column when the business AP is a file server. "DB" is set to the business AP column when the business AP is a DB (DataBase) server. "Web" is set to the business AP column when the business AP is a Web server. The AP priority column has registered therein numerical values indicating the AP priority. The AP priority indicates that the larger the numerical value is, the higher (more preferential) the priority is.

For example, the AP priority condition table 113 has registered therein information indicating that the AP priority is "1" when the business AP is "FS". Similarly, the AP priority is "2" when the business AP is "DB". The AP priority is "3" when the business AP is "Web". The larger the numerical value is, the higher the priority is, and therefore the AP priority "3" is the highest priority and the AP priority "1" is the lowest priority in the AP priority condition table 113.

FIG. 9 illustrates an exemplary virtual machine management table of the second embodiment. The virtual machine management table 114 is a table for managing the property of a virtual machine. The virtual machine management table 114 is stored in the storage unit 110. The virtual machine management table 114 includes columns for virtual machine name, business AP, business group, continuation priority, installation site, and backup site.

The virtual machine name column has registered therein identification information of virtual machines. Here, the virtual machine name of the virtual machine 210 is "VM (Virtual Machine) 1". The virtual machine name of the virtual machine 220 is "VM2". The virtual machine name of the virtual machine 210a is "VM3". The virtual machine name of the virtual machine 220a is "VM4". The virtual machine name of the virtual machine 210b is "VM5". The virtual machine name of the virtual machine 220b is "VM6". The virtual machine name of the virtual machine 210c is "VM7". The virtual machine name of the virtual machine 220c is "VM8".

The business AP column has registered therein information indicating business APs to be executed on virtual machines. The business group column has registered therein numbers of business groups to which virtual machines belong. A business group is a unit indicating a set of virtual machines cooperating on a process relating to a single business. For example, each business group includes virtual machines as a file server, a DB server, and a Web server cooperating with one another. The continuation priority column has registered therein numerical values indicating the continuation priority according to the importance of virtual machines. The continuation priority is a priority individually set to a virtual machine. An arbitrary priority with regard to continuing processing may be set as the continuation priority. For example, the continuation priority indicates that the larger the numerical value is, the higher (more preferential) the priority is.

The installation site column has set therein data center names in which execution servers allowing virtual machines to operate thereon are installed. The backup site column has set therein data center names of data centers in which the backup server 300 storing backup data of virtual machines is installed.

For example, the virtual machine management table 114 provides information indicating that the virtual machine name is "VM1", the continuation priority is "1", the business AP is "FS", the business group is "1", the installation site is "DC1", and the backup site is "DC3". The information indicates that with regard to the virtual machine 210, its business AP is a file server and it belongs to a business group "1" and has a continuation priority "1". In addition, the information also indicates that the execution server 200 executing the virtual machine 210 is installed in the data center 30, and the backup server 300 storing backup data is installed in the data center 50.

Here, the virtual machines 210a, 210b and 220b also belong to the business group "1". In addition, the continuation priority of the virtual machine 210a is "2", the continuation priority of the virtual machine 210b is "3", and the continuation priority of the virtual machine 220b is "4". Accordingly, the virtual machines 210, 210a, 210b and 220b cooperate with one another to realize predetermined business processing. The continuation priority of the virtual machine 220b is the highest among them. The continuation priority of the virtual machine 210b is the second highest. The continuation priority of the virtual machine 210a is the third highest. The continuation priority of the virtual machine 210 is the lowest.

FIG. 10 illustrates an exemplary backup history management table of the second embodiment. The backup history management table 115 is a table for managing backup histories of respective virtual machines. The backup history management table 115 is stored in the storage unit 110. The backup history management table 115 includes columns for item number, virtual machine name, start date/time, end date/time, and result.

The item number column has registered therein item numbers. The virtual machine name column has registered therein virtual machine names. The start date/time column has registered therein time points at which backups have been started. The end date/time column has registered therein time points at which backups have been terminated. The result column has registered therein results indicating whether backups have succeeded or failed. For example, "success" is registered when a backup has succeeded. "Failure" is registered when a backup has failed.

For example, the backup history management table 115 has registered therein information indicating an item number "1", a virtual machine name "VM1", a start date/time "10/2 4:00", an end date/time "10/2 5:20" and a result "success". The information indicates that a backup for the virtual machine 210 started at 4:00 a.m. on October 2 and ended at 5:20 a.m. on October 2, and that the backup succeeded (normal termination).

On the other hand, for example, the backup result for the virtual machine 210c ("VM7") is a "failure", according to the record of the item number "7". The information indicates that the backup failed (abnormal termination). In such a case, backup data of the virtual machine 210c has not been normally acquired.

The backup history management table 115 may have stored therein the latest backup history for a predetermined number of times (e.g., about 1 to 3 times) for each virtual machine, or the entire backup history of the past.

FIG. 11 illustrates an exemplary backup priority table of the second embodiment. The backup priority table 116 is a table for managing backup priorities for respective virtual machines. The backup priority table 116 is stored in the storage unit 110. The backup priority table 116 includes columns for virtual machine name and backup priority.

The virtual machine name column has registered therein virtual machine names. The backup priority column has registered therein backup priorities. For example, the backup priority table 116 has registered therein information indicating a virtual machine name "VM1" and a backup priority "1". The information indicates that the backup priority of the virtual machine 210 according to the latest backup history is "1".

FIG. 12 illustrates a migration order table of the second embodiment. The migration order table 117 is a table for managing the migration order of virtual machines evaluated by the management unit 120 based on continuation priorities, AP priorities, and backup priorities for respective virtual machines. The migration order table 117 is stored in the storage unit 110. The migration order table 117 includes columns for virtual machine name, overall priority evaluation value, and migration order.

The virtual machine name column has registered therein virtual machine names. The overall priority evaluation value column has registered therein values (overall priority evaluation value) which have been comprehensively evaluated considering the continuation priority, the AP priority and the backup priority. The overall priority evaluation value indicates that the larger the numerical value is, the higher the priority is (more preferential). The migration order column has registered therein the migration order.

Here, an overall evaluation value of priority is calculated by summing the continuation priority, the AP priority, and the backup priority, based on the priority condition table 112, the AP priority condition table 113, and the virtual machine management table 114. For example, the overall priority evaluation value for the virtual machine 210 (VM1) is given by 1+1+1=3. The overall priority evaluation value for the virtual machine 220 (VM2) is given by 2+1+5=8. The overall priority evaluation value for the virtual machine 210*a* (VM3) is given by 2+2+1=5. The overall priority evaluation value for the virtual machine 220*a* (VM4) is given by 3+2+4=9. The overall priority evaluation value for the virtual machine 210*b* (VM5) is given by 3+3+2=8. The overall priority evaluation value for the virtual machine 220*b* (VM6) is given by 4+3+3=10. The overall priority evaluation value for the virtual machine 210*c* (VM7) is given by 3+3+6=12. The overall priority evaluation value for the virtual machine 220*c* (VM8) is given by 4+3+6=13.

When overall evaluation values of priority are the same, the migration order is determined in the order of higher backup priority. Therefore, the migration order turns out to be, VM8 (migration order "1"), VM7 (migration order "2"), VM6 (migration order "3"), VM4 (migration order "4"), VM2 (migration order "5"), VM5 (migration order "6"), VM3 (migration order "7"), and VM1 (migration order "8").

Although, as described above, the migration order is determined using backup priority when overall evaluation values of priority are the same, the migration order may be determined by prioritizing other than the backup priority. For example, the migration order may be determined by comparing continuation priorities, or the migration order may be determined by comparing AP priorities. Input of user selection may also be allowed for determining which priority to be compared when overall evaluation values of priority are the same.

Figure 13:
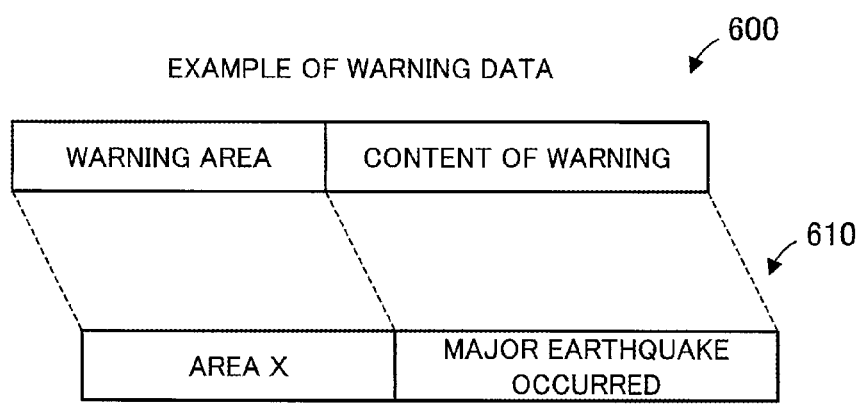
FIG. 13 illustrates warning data of the second embodiment.

FIG. 13 illustrates warning data of the second embodiment. The warning data 600 is communication data for notifying the control server 100 of a warning by which the warning server 400 or the sensor devices 500, 500*a* and 500*b* alert occurrence of a disaster in a predetermined area. The warning data 600 is transmitted to the control server 100 by the warning server 400 or the sensor devices 500, 500*a* and 500*b*.

The warning data 600 has fields for warning area and content of warning. The warning-area field has set therein information indicating an area in which a disaster has occurred and an area which may be affected by the disaster. The content-of-warning field has set therein information indicating the content of warning.

For example, when a major earthquake has occurred in an area X, warning data 610 including a warning area field "area X" and a content-of-warning field "major earthquake occurred" is transmitted from the warning server 400 or the like.

Figure 14:
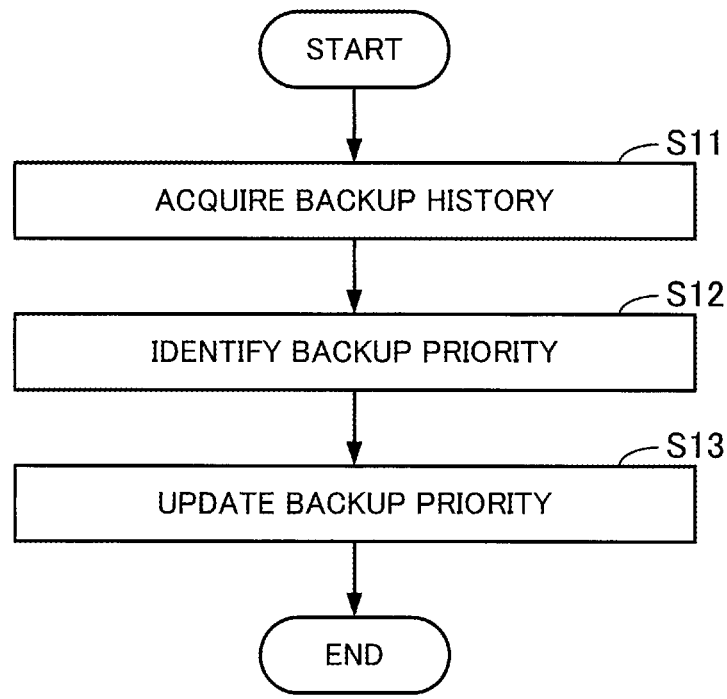
FIG. 14 is a flowchart illustrating an exemplary determination of the priority of the second embodiment.

FIG. 14 is a flowchart illustrating an exemplary determination of the priority of the second embodiment. In the following, the procedure illustrated in FIG. 14 will be described along with step numbers.

(Step S11) The management unit 120 receives backup histories from respective virtual machines. The management unit 120 updates respective pieces of information (start date/time, end date/time, and result of backup) of the backup history management table 115, based on the received backup history.

(Step S12) The management unit 120 identifies the backup priority of each virtual machine based on the backup history. Specifically, the management unit 120 retrieves the end time of the latest backup for each virtual machine from the backup history management table 115. The management unit 120 calculates the elapsed time from the retrieved end time to the current time. The management unit 120 retrieves the backup priority, based on the calculated elapsed time and the priority condition table 112. The management unit 120 then identifies the retrieved backup priority as the backup priority of the virtual machine. The management unit 120, each time receiving the backup history for one virtual machine, may perform step S12 on the virtual machine.

(Step S13) The management unit 120 updates the backup priority with the identified backup priority, for each virtual machine name in the backup priority table 116.

Execution of the procedure of FIG. 14 may be started at a timing when the management unit 120 has received the warning data 600 from the warning server 400 or the like. In addition, the elapsed time from the start time of the latest backup to the current time may be used as the "elapsed time from the latest backup" described in the priority condition table 112.

Furthermore, the latest backup may have failed at step S12. In such a case, the management unit 120 may provide the virtual machine in question with the highest backup priority in the priority condition table 112. Alternatively, when there exists in the backup history management table 115 a history of a successful backup at a time point before the latest backup for the virtual machine in question, the backup priority may be determined based on the history of the successful backup. In addition, there may exist a virtual machine for which backup is not regularly taken. The management unit 120 may provide such a virtual machine with the highest backup priority.

Upon receiving a notification that a disaster has occurred from the warning server 400, the sensor device 500, or the like, the management unit 120 starts migration control of virtual machines. Next, a procedure of the migration control will be described.

Figure 15:
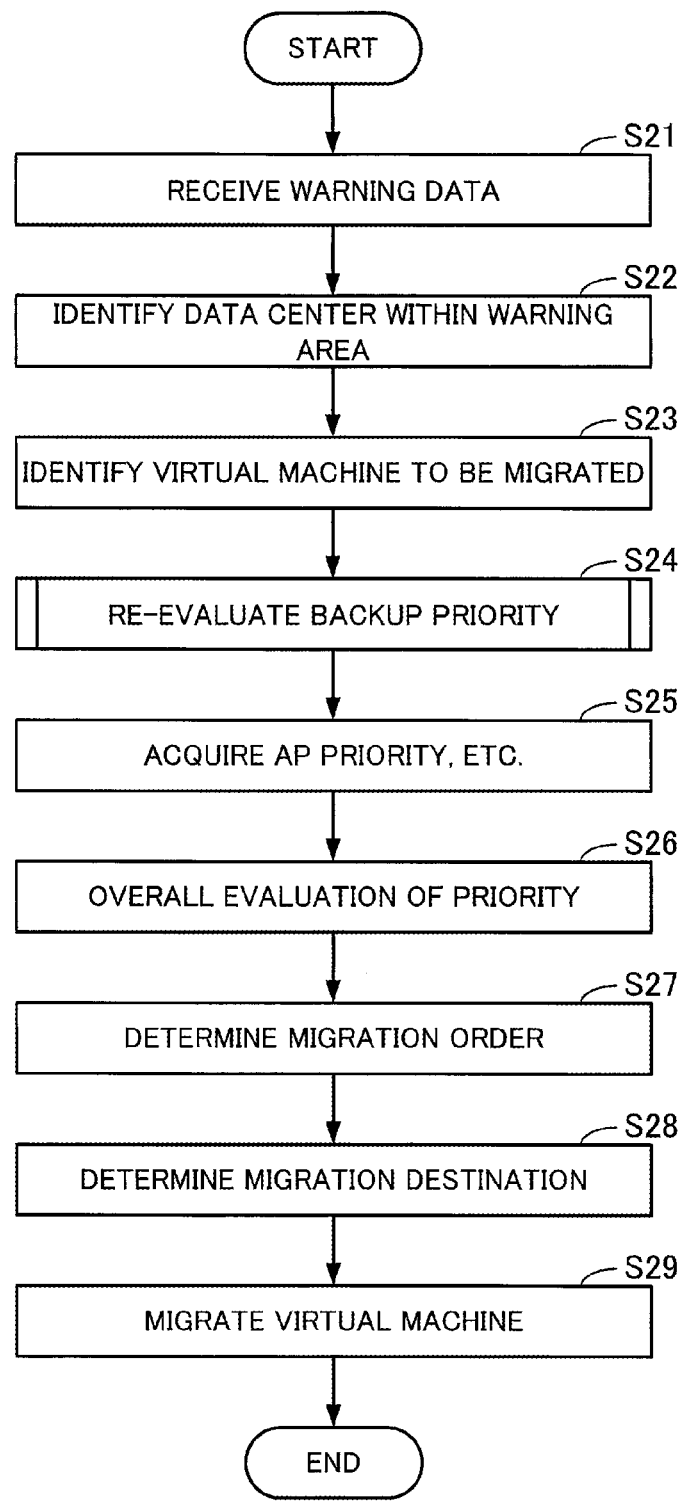
FIG. 15 is a flowchart illustrating an exemplary migration of the virtual machine of the second embodiment.

FIG. 15 is a flowchart illustrating an exemplary migration of the virtual machine of the second embodiment. In the following, the procedure illustrated in FIG. 15 will be described along with step numbers.

(Step S21) The management unit 120 receives warning data 600 from the warning server 400. For example, the warning data 600 has stored therein information indicating a warning area "area X", and content of warning "major earthquake occurred", as described above.

(Step S22) Referring to the warning data 600, the management unit 120 recognizes the warning area. Referring to the DC management table 111, the management unit 120 identifies the data center included in the warning area. For example, when the warning area is "area X", it turns out that the data centers 40 and 50 are included in the warning area.

(Step S23) The management unit 120 identifies virtual machines to be migrated. Specifically, the management unit 120 selects virtual machines to be migrated in the data center identified at step S22, referring to the virtual machine management table 114. When the data centers 40 and 50 are included in the warning area, it turns out that the virtual machines 210, 220, 210*a*, 220*a*, 210*b*, 220*b*, 210*c* and 220*c* are to be migrated.

(Step S24) The management unit 120 re-evaluates the backup priority with regard to the virtual machines to be migrated. Details thereof will be described below.

(Step S25) Referring to the AP priority condition table 113 and the virtual machine management table 114, the management unit 120 acquires a continuation priority and an AP priority with regard to the virtual machines to be migrated. Specifically, the acquiring of a continuation priority acquires, from the virtual machine management table 114 and for each virtual machine to be migrated, a continuation priority of a virtual machine coinciding with the corresponding virtual machine. In addition, the acquiring of an AP priority retrieves, from the virtual machine management table 114 and for each virtual machine to be migrated, a business AP corresponding to the virtual machine. The management unit 120 then acquires the AP priority of the retrieved business AP from the AP priority condition table 113.

(Step S26) The management unit 120 performs, for each of the retrieved virtual machines, an overall evaluation of priorities based on the acquired continuation priority, AP priority and backup priority, and creates the migration order table 117. Specifically, the management unit 120 calculates the overall priority evaluation value for each virtual machine by summing the values of the continuation priority, AP priority and backup priority, and registers the overall priority evaluation value in the migration order table 117.

(Step S27) The management unit 120 determines the migration order of virtual machines based on the overall priority evaluation for respective virtual machines. The management unit 120 determines the migration order in descending order of overall priority evaluation values, and registers the migration order in the migration order table 117.

(Step S28) The management unit 120 determines a migration destination data center from among the data centers located outside the warning area. For example, according to the DC management table 111, a data center 50 exists in "area Y", which is outside the warning area "area X". Therefore, the management unit 120 selects the data center 50 as the migration destination. When there exists a plurality of candidates for the migration destination data center, the data center located in the area farthest from the warning area may be selected. This is because such an area has a low possibility to be affected by the disaster. In addition, the management unit 120 determines the migration destination execution servers from among the execution servers in the determined data center. The execution servers 200d and 200e exist in the data center 50. The management unit 120 selects the execution servers 200d and 200e as the migration destination execution servers.

(Step S29) Referring to the migration order table 117, the migration control unit 130 instructs the migration source execution servers to migrate respective virtual machines to be migrated to the migration destination execution servers in the order determined by the management unit 120. For example, the migration control unit 130 instructs the execution servers 200, 200a, 200b and 200c, in sequence, to migrate the virtual machines 210, 220, 210a, 220a, 210b, 220b, 210c and 220c to the execution servers 200d and 200e.

In the above manner, the management unit 120 determines the migration order of the plurality of virtual machines based on the backup history, and controls each execution server so as to migrate the plurality of virtual machines in the determined migration order. At step S28, the management unit 120 may determine the migration destination execution servers based on available resources or load after migration of the execution servers installed in the migration destination data center. For example, it is conceivable to take into account the load applied by operation of a virtual machine, availability of resources for use in operation of a virtual machine, the width of the band for migrating a virtual machine.

In addition, at step S29, each execution server may migrate virtual machines using a technique referred to as live migration. Specifically, it is conceivable to adopt the following procedure, assuming a case of migrating the virtual machine 210 to the execution server 200d.

(1) Reserve CPU/memory resources for the virtual machine 210 on the execution server 200d. (2) Copy the data of the memory resource allocated to the virtual machine 210 in the execution server 200, to the memory resource newly allocated for the virtual machine 210 on the execution server 200d. (3) Copy the state of the CPU resource allocated to the virtual machine 210 from the execution server 200 to the execution server 200d, and shut down the virtual machine 210 in the execution server 200. (4) Restart the virtual machine 210 on the execution server 200d, and release the resources allocated to the virtual machine 210 in the execution server 200. (5) Update the network setting (e.g., predetermined address, etc.) with regard to the virtual machine 210 on the execution server 200d. Accordingly, the virtual machine 210 is enabled to operate similarly to before the migration.

However, the data associated with the virtual machine 210 may be copied to the execution server 200d and then the virtual machine 210 may be migrated onto the execution server 200d, after shutting down the virtual machine 210 on the execution server 200. Next, a procedure of re-evaluating the backup priority of step S24 will be described.

Figure 16:
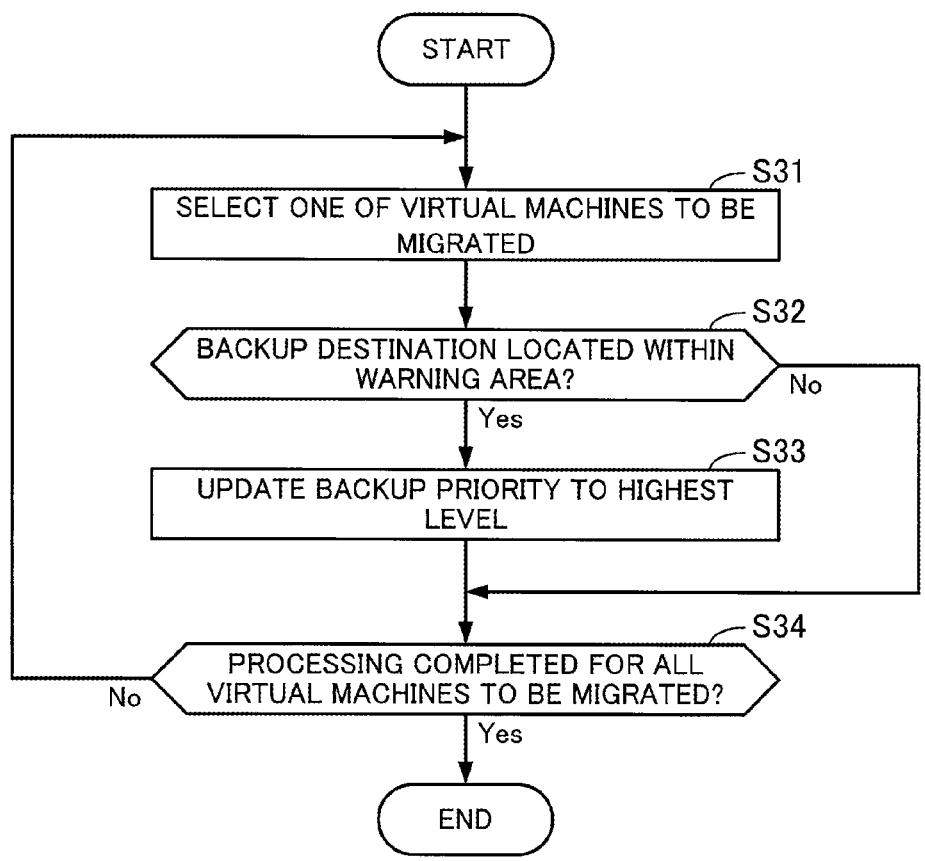
FIG. 16 is a flowchart illustrating an exemplary re-evaluation of the priority of the second embodiment.

FIG. 16 is a flowchart illustrating an exemplary re-evaluation of the priority of the second embodiment. In the following, the procedure illustrated in FIG. 16 will be described along with step numbers.

(Step S31) The management unit 120 selects one of the virtual machines to be migrated which has been identified at step S23.

(Step S32) The management unit 120 recognizes the backup destination of the virtual machine. Specifically, the management unit 120 recognizes the backup site of the virtual machine in question, with regard to the virtual machine management table 114. The management unit 120 determines whether or not the recognized backup site is located within the warning area. When the backup site is located within the warning area, the process flow proceeds to step S33. When the backup site is located outside the warning area, the process flow proceeds to step S34.

(Step S33) The management unit 120 updates the backup priority of the selected virtual machine to the highest level, with regard to the backup priority table 116. For example, the highest level backup priority is the maximum value of backup priorities which have been set in the priority condition table 112. Alternatively, a larger predetermined value will do.

(Step S34) The management unit 120 determines whether or not processing has been completed for all the virtual machines to be migrated. When processing has been completed for all the virtual machines to be migrated, the procedure is terminated. When processing has not been completed for all the virtual machines to be migrated, the process flow proceeds to step S31.

In the above manner, the management unit 120 re-evaluates the backup priority of the virtual machine, based on whether or not the backup destination of the virtual machine to be migrated is located within the warning area. When the backup server to be the backup destination exists within the warning area, there is a risk that the installation site of the backup server may collapse, or become unusable due to a power failure. Accordingly, it turns out to be difficult to use backup data for restoring. Therefore, the management unit 120 raises the backup priority of the virtual machine whose backup destination exists within the warning area to the highest level. Accordingly, it becomes possible to control so that the virtual machine is preferentially migrated to another site.

Figure 17:
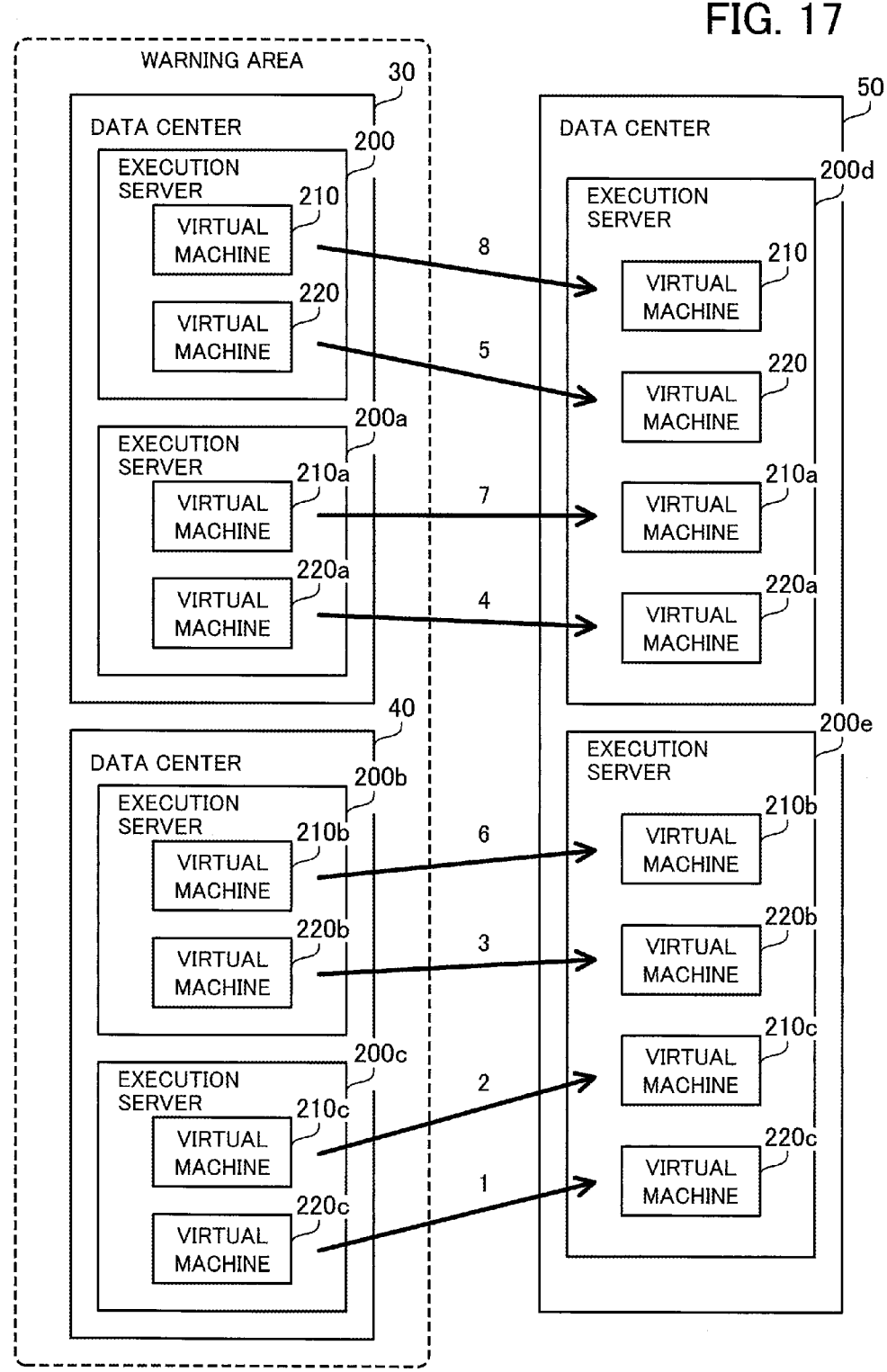
FIG. 17 illustrates an exemplary migration of the virtual machine of the second embodiment.

FIG. 17 illustrates an exemplary migration of the virtual machine of the second embodiment. In FIG. 17, there is illustrated a specific example of migration of a virtual machine when a disaster has occurred. The data centers 30 and 40 are included in the warning area. The migration order is as set in the migration order table 117. In addition, the migration destination of the virtual machines 210, 210*a*, 220 and 220*a* is the execution server 200*d* located in the data center 50. The migration destination of the virtual machines 210*b*, 210*c*, 220*b* and 220*c* is the execution server 200*e* located in the data center 50.

In such a case, the control server 100 controls the execution servers 200, 200*a*, 200*b* and 200*c* so that each virtual machine is migrated in the following order. First, the virtual machine 220*c* (VM8) is migrated to the execution server 200*e*. Second, the virtual machine 210*c* (VM7) is migrated to the execution server 200*e*. Third, the virtual machine 220*b* (VM6) is migrated to the execution server 200*e*. Fourth, the virtual machine 220*a* (VM4) is migrated to the execution server 200*d*. Fifth, the virtual machine 220 (VM2) is migrated to the execution server 200*d*. Sixth, the virtual machine 210*b* (VM5) is migrated to the execution server 200*e*. Seventh, the virtual machine 210*a* (VM3) is migrated to the execution server 200*d*. Finally, the virtual machine 210 (VM1) is migrated to the execution server 200*d*.

Here, a procedure of calculating the overall priority evaluation value by summing the backup priorities AP priorities and continuation priorities has been illustrated as an exemplary method of evaluating the migration order. However, other methods may be used. For example, the overall priority evaluation value may be calculated for each business group. Specifically, the following evaluation is conceivable.

FIG. 18 illustrates another exemplary evaluation (part 1) of the migration order of the second embodiment. A migration order table 117*a* is stored in the storage unit 110 in place of the migration order table 117. The migration order table 117*a* includes columns for virtual machine name, overall priority evaluation value, and migration order.

The virtual machine name column has registered therein virtual machine names. The overall priority evaluation value column has set therein the total value for the virtual machine whose total value of respective priorities calculated similarly to FIG. 12 has turned out to be the highest among the virtual machines belonging to a business group.

With regard to virtual machines belonging to a business group "1", for example, the total value for the virtual machine 210 (VM1) is "3", the total value for the virtual machine 210*a* (VM3) is "5", the total value for the virtual machine 210*b* (VM5) is "8", and the total value for the virtual machine 220*b* (VM6) is "10", and therefore the overall priority evaluation value of VM1, VM3, VM5 and VM6 turns out to be "10".

Similarly, with regard to virtual machines belonging to a business group "2", the total value for the virtual machine 220 (VM2) is "8", the total value for the virtual machine 220*a* (VM4) is "9", the total value for the virtual machine 210*c* (VM7) is "12", and the total value for the virtual machine 220*c* (VM8) is "13", and therefore the overall priority evaluation value of VM2, VM4, VM7 and VM8 turns out to be 13.

The migration order column has set therein the migration order in descending order of the overall priority evaluation values. When the overall priority evaluation values are the same, the migration order is set in descending order of the total values. Accordingly, the migration order turns out to be the order of VM8, VM7, VM4, VM2, VM6, VM5, VM3 and VM1.

As described above, the migration order may be determined using the total value for the virtual machine whose total value is the maximum among the virtual machines included in a business group as the overall priority evaluation value of each virtual machine included in the business group. The migration order may also be determined using the average value of the total values calculated for respective virtual machines included in a business group as the overall priority evaluation value of each virtual machine in the business group.

In addition, it is conceivable to calculate the overall priority evaluation value using yet another method. For example, the overall priority evaluation value may be calculated by weighting and then summing the priorities. Specifically, the following evaluation is conceivable.

FIG. 19 illustrates another exemplary evaluation (part 2) of the migration order of the second embodiment. A migration order table 117*b* is stored in the storage unit 110 in place of the migration order table 117. The migration order table 117*b* includes columns for virtual machine name, overall priority evaluation value, and migration order.

The virtual machine name column has registered therein virtual machine names. The overall priority evaluation value column has set therein the result of weighting and then summing the continuation priorities, AP priorities and backup priorities in the virtual machine management table 114. In FIG. 16, for example, it is assumed that the weight of the continuation priority is "3", the weight of the AP priority is "1", and the weight of the backup priority is "5".

In such a case, the overall priority evaluation value for the virtual machine 210 (VM1) turns out to be 1×3+1×1+1×5=9. The overall priority evaluation value for the virtual machine 220 (VM2) turns out to be 2×3+1×1+5×5=32. The overall priority evaluation value for the virtual machine 210*a* (VM3) turns out to be 2×3+2×1+1×5=13. The overall priority evaluation value for the virtual machine 220*a* (VM4) turns out to be 3×3+2×1+4×5=31. The overall priority evaluation value for the virtual machine 210*b* (VM5) turns out to be 3×3+3×1+2×5=22. The overall priority evaluation value for the virtual machine 220*b* (VM6) turns out to be 4×3+3×1+3×5=30. The overall priority evaluation value for the virtual machine 210*c* (VM7) turns out to be 3×3+3×1+6×5=42. The overall priority evaluation value for the virtual machine 220*c* (VM8) turns out to be 4×3+3×1+6×5=45.

Therefore, the migration order turns out to be the order of VM8, VM7, VM2, VM4, VM6, VM5, VM3 and VM1. In this manner, the migration order may be determined based on the overall priority evaluation value which has resulted from weighting and summing the priorities.

As described above, the control server 100, upon receiving the warning data 600 from the warning server 400 or the like, determines a migration order of virtual machines, based on the continuation priority, AP priority and backup priority of each virtual machine existing in the data centers 30 and 40. The control server 100 then controls each execution server so as to migrate virtual machines to the data center 50 in the migration order. Particularly, the migration order is determined based on the backup priority, and therefore virtual machines may be migrated in the order considering the restorable state for each virtual machine.

Specifically, migration of a virtual machine whose backup has been taken at a later time point is postponed. This is because the later a backup has been taken, the newer the restorable time point is. Accordingly, even when any of the virtual machines have failed to be migrated in time, there is a higher possibility that the virtual machines are restored to a newer time point using backup data. Therefore, adverse effect on the business system may be mitigated even when any of the virtual machines have failed to be migrated in time.

In addition, the migration order may be determined considering any priority other than the backup priority (such as AP priority or continuation priority). Accordingly, it becomes possible to determine the migration order comprehensively, considering not only the status of backups but also the business priorities.

In addition, the control server 100 may efficiently detect a timing to start migration of virtual machines such as a disaster by receiving the warning data 600. The detecting method in an emergency is not limited to receiving the warning data 600. For example, the timing to start migration of virtual machines may be detected by receiving a notification, issued from an uninterruptible power supply when a power failure has occurred, of starting power supply from a battery. In such a case, the virtual machines to be migrated may be identified based on the virtual machine management table 114, provided that the control server 100 has preliminarily held information indicating in which data center the uninterruptible power supply that sent the notification is installed. Alternatively, the information indicating the data center may be included in the notification of starting power supply.

In addition, the control server 100 migrates only the virtual machines existing in the data centers 30 and 40 within the warning area included in the warning data 600. Accordingly, the control server 100 may limit the virtual machines to be migrated within a limited time. Therefore, it becomes possible to efficiently migrate virtual machines.

In addition, when the backup destination data center of data to be processed by a virtual machine to be migrated is located within the warning area, the control server 100 raises the backup priority of the virtual machine and controls so that the virtual machine is preferentially migrated. Accordingly, the control server 100 may determine the migration order, considering a case where the backup destination data center of a virtual machine to be migrated has been involved in a disaster or the like.

As described above, the information processing according to the first embodiment may be realized by causing the operation unit 1b to execute a program. In addition, the information processing according to the second embodiment may be realized by causing the processor 101 to execute a program. Such a program may be stored on a computer-readable storage medium (e.g., storage medium 13). For example, a magnetic disk, an optical disk, a magneto-optical disk, a semiconductor memory, or the like may be used as a storage medium. An FD and an HDD are categorized as magnetic disks. A CD, a CD-R (Recordable)/RW (Rewritable), a DVD and a DVD-R/RW are categorized as optical disks.

When distributing a program, for example, a portable storage medium having stored the program thereon is provided. In addition, a program may be stored in a storage device of another computer and distributed via the network 20. For example, the computer stores, in a storage device (e.g., the HDD 103), a program stored on a portable storage medium or a program received from another computer, reads the program from the storage device, and executes the program. However, a program read from a portable storage medium may be directly executed, or a program received from another computer via the network 20 may be directly executed. In addition, it is also possible to realize at least a part of the aforementioned information processing using an electronic circuit such as a DSP, an ASIC and a PLD.

According to an embodiment, it is possible to migrate virtual machines in an order considering the restorable state.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store information indicating a backup history of data associated with each of a plurality of virtual machines operating on one or more apparatuses; and
a processor configured to perform a procedure including determining an order of migrating each of the plurality of virtual machines to one or more other apparatuses, based on the information indicating the backup history, and controlling the one or more apparatuses so as to migrate each of the plurality of virtual machines in the order.

2. The information processing apparatus according to claim 1, wherein the determining includes determining the order, based on a time at which a backup has been performed for each of the plurality of virtual machines.

3. The information processing apparatus according to claim 2, wherein the determining includes determining the order so as to preferentially migrate a virtual machine having a larger time difference between the time at which a backup has been performed and current time.

4. The information processing apparatus according to claim 1, wherein the determining includes determining the order, based on whether a backup performed for each of the plurality of virtual machines has succeeded or failed.

5. The information processing apparatus according to claim 4, wherein the determining includes determining the order so as to preferentially migrate a virtual machine whose backup has failed.

6. The information processing apparatus according to claim 1, wherein the determining includes determining the order, based on information indicating an installation site of a storage device which is a storage destination of data which has been backed up.

7. The information processing apparatus according to claim 6, wherein the determining includes determining the order so as to preferentially migrate a virtual machine whose storage device which is a storage destination of backed up data is installed at a site located in an area which is affected by an influence of a disaster.

8. The information processing apparatus according to claim 1, wherein the determining includes determining the order for a virtual machine operating on an apparatus which is affected by an influence of a disaster, among the one or more apparatuses.

9. The information processing apparatus according to claim 8, wherein the memory stores information indicating an area in which the one or more apparatuses are installed, and
- upon reception of information indicating an area which is affected by an influence of a disaster notified from a warning apparatus, the determining includes identifying an apparatus affected by the influence of the disaster, based on the information stored in the memory.

10. The information processing apparatus according to claim 1, wherein
- the memory stores information indicating importance of each of the plurality of virtual machines, and
- the determining includes determining the order, based on the information indicating the backup history and the information indicating the importance.

11. A non-transitory computer-readable storage medium storing a computer program that causes a computer to perform a procedure comprising:
- determining an order of migrating each of a plurality of virtual machines to one or more other apparatuses, based on information indicating backup history of data associated with each of the plurality of virtual machines operating on one or more apparatuses, and
- controlling the one or more apparatuses so as to migrate each of the plurality of virtual machines in the order.

12. A virtual machine migration method comprising:
- determining, by a processor, an order of migrating each of a plurality of virtual machines to one or more other apparatuses, based on information indicating backup history of data associated with each of the plurality of virtual machines operating on one or more apparatuses, and
- controlling, by the processor, the one or more apparatuses so as to migrate each of the plurality of virtual machines in the order.

* * * * *